(12) United States Patent
Tondu

(10) Patent No.: US 12,220,896 B2
(45) Date of Patent: Feb. 11, 2025

(54) LAMINATED GLAZING FOR A LIGHT AERIAL VEHICLE, HEATING OVER A PORTION OF ITS SURFACE

(71) Applicant: SAINT-GOBAIN GLASS FRANCE, Courbevoie (FR)

(72) Inventor: Thomas Tondu, Saint-Martin D'Abbat (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 333 days.

(21) Appl. No.: 17/778,730

(22) PCT Filed: Nov. 18, 2020

(86) PCT No.: PCT/FR2020/052123
§ 371 (c)(1),
(2) Date: May 20, 2022

(87) PCT Pub. No.: WO2021/099741
PCT Pub. Date: May 27, 2021

(65) Prior Publication Data
US 2022/0410539 A1    Dec. 29, 2022

(30) Foreign Application Priority Data
Nov. 21, 2019    (FR) ..................... 1913029

(51) Int. Cl.
*B32B 17/10*    (2006.01)
*B32B 3/04*    (2006.01)
(Continued)

(52) U.S. Cl.
CPC .......... *B32B 17/10174* (2013.01); *B32B 3/04* (2013.01); *B32B 7/12* (2013.01);
(Continued)

(58) Field of Classification Search
None
See application file for complete search history.

(56) References Cited

U.S. PATENT DOCUMENTS 4,645,146 A * 2/1987 Hall ................. B32B 17/10293
156/304.6
2006/0152137 A1* 7/2006 Beteille .............. B32B 17/1077
313/503
(Continued)

FOREIGN PATENT DOCUMENTS

EP    2743080 A1 *    6/2014    ............. B32B 27/08
GB    2 157 754 A    10/1985

OTHER PUBLICATIONS

International Search Report as issued in International Patent Application No. PCT/FR2020/052123, dated Feb. 19, 2021.

*Primary Examiner* — Tamra L. Dicus
(74) *Attorney, Agent, or Firm* — Pillsbury Winthrop Shaw Pittman LLP

(57) ABSTRACT

A light aerial vehicle laminated glazing includes a structural transparent plastic sheet covering the whole of the surface of the glazing, a protective transparent plastic sheet covering the whole of the surface of the glazing, an interlayer adhesive bonding the structural and protective sheets, a glass covered with a conductive layer having a heating function incorporated within the adhesive and covering a fraction of the surface of the glazing at most equal to 66% containing the main viewing zone.

20 Claims, 2 Drawing Sheets

(51) Int. Cl.
- *B32B 7/12* (2006.01)
- *B32B 27/08* (2006.01)
- *B32B 27/30* (2006.01)
- *B32B 27/36* (2006.01)
- *B32B 27/40* (2006.01)
- *B64C 27/04* (2006.01)
- *B64D 15/12* (2006.01)

(52) U.S. Cl.
CPC .. *B32B 17/10027* (2013.01); *B32B 17/10137* (2013.01); *B32B 17/10761* (2013.01); *B32B 17/1077* (2013.01); *B32B 17/10788* (2013.01); *B32B 27/08* (2013.01); *B32B 27/308* (2013.01); *B32B 27/36* (2013.01); *B32B 27/365* (2013.01); *B32B 27/40* (2013.01); *B32B 2250/44* (2013.01); *B32B 2270/00* (2013.01); *B32B 2274/00* (2013.01); *B32B 2307/202* (2013.01); *B32B 2307/412* (2013.01); *B32B 2307/584* (2013.01); *B32B 2307/7265* (2013.01); *B32B 2307/728* (2013.01); *B32B 2307/732* (2013.01); *B32B 2605/006* (2013.01); *B32B 2605/18* (2013.01); *B64C 27/04* (2013.01); *B64D 15/12* (2013.01)

(56) References Cited

U.S. PATENT DOCUMENTS

| | | | |
|---|---|---|---|
| 2013/0299856 A1* | 11/2013 | Verger | B60Q 3/208 |
| | | | 438/27 |
| 2015/0253486 A1* | 9/2015 | Verger | B60Q 3/51 |
| | | | 362/606 |
| 2020/0215797 A1* | 7/2020 | Tondu | B32B 17/10192 |

* cited by examiner

[Fig. 1]
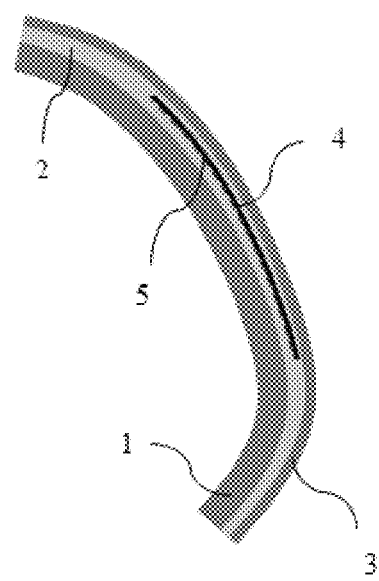

[Fig. 2]
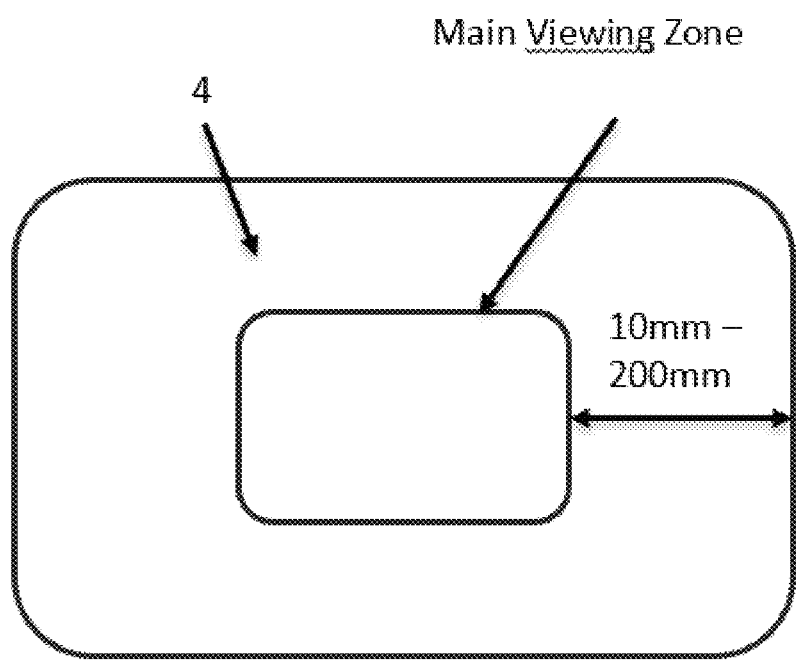

LAMINATED GLAZING FOR A LIGHT AERIAL VEHICLE, HEATING OVER A PORTION OF ITS SURFACE

CROSS-REFERENCE TO RELATED APPLICATIONS

This application is the U.S. National Stage of PCT/FR2020/052123, filed Nov. 18, 2020, which in turn claims priority to French patent application number 1913029 filed Nov. 21, 2019. The content of these applications are incorporated herein by reference in their entireties.

The invention relates to a solution for heating the viewing zone for plastic-based large-sized helicopter glazings.

Helicopter glazings can be equipped with integrated heating solutions so as to prevent the appearance of ice or mist under severe flying conditions. The heating solutions are contributed by the Joule effect inside the glazing. These glazings are thus necessarily composed of several materials in order to insert, into the latter, resistive elements constituted either of wires sufficiently thin to make possible good light transmission or of a transparent or semitransparent conductive layer.

Furthermore, helicopter glazings are targeted at providing a minimal mass which is dimensioned either by stiffness requirements (control of the strains or vibrations) in the envelope of the operating conditions or by a requirement of resistance to bird strikes.

Finally, helicopter glazings are particularly subject to the impact of small stones which can, for example, be suspended in the air by the aerodynamic turbulence induced by the blades and then be projected at high speed onto the glazings after being struck by a blade.

The materials of choice for resisting bird strikes on helicopters are plastics (organic polymer materials), such as polycarbonate (PC), polymethyl methacrylate (PMMA), polyvinylbutyral (PVB) or thermoplastic polyurethane (TPU).

For nonheated glazings, nonlaminated solutions can be employed. Consideration may then be given to materials such as PC, which provides excellent resistance to bird strikes, or such as PMMA, which ages better and is stiffer.

These plastics are also compatible with large-sized glazings with complex shapes (low radii of curvature, nondevelopable shapes).

Nevertheless, these designs having a single plastic sheet do not make possible the incorporation of a heating system.

By laminating two plastic sheets, it is possible to incorporate a network of heating wires. Nevertheless, heating wire technologies cause, for plastic glazings, severe optical trouble by generation of a temperature gradient around each wire and thus of an optical index gradient producing optical lenses.

Furthermore, the thin wires are subjected to mechanical fatigue which degrades their lifetime.

Finally, the networks of thin wires cause light diffractions and reflections troublesome to the pilots.

The specific powers necessary for the anti-icing functions on helicopters are difficult to render compatible with conductive layers. The most robust solutions can be gold-based. Nevertheless, these solutions remain of low reliability for specific powers of 40 W/dm$^2$. In addition, gold layers are colored. In the case of a complex shape of the heated zone, this can cause variations in light transmission on the glazing troublesome for the pilots.

The use of glass sheets then contributes the advantage of being compatible with the deposition of more effective conductive layers of ITO type (neutrality in color, compatible with high specific powers, high light transmission, compatibility with complex heating zone shapes). In the case of the use of wire systems, by positioning them in contact with the glass, the optical defects are also reduced.

However, glass is easily damaged by small stones, which requires a significant thickness disadvantageous to the mass of the glazings. Furthermore, the production of large glass glazings with small radii of curvature and highly nondevelopable shapes is a problem unsolved industrially.

In order to overcome these disadvantages, a subject matter of the invention is a light aerial vehicle laminated glazing constituted of at least:
 one structural transparent plastic sheet covering the whole of the surface of the glazing,
 one protective transparent plastic sheet covering the whole of the surface of the glazing,
 one "interlayer" adhesive bonding the structural and protective sheets,
 one glass covered with a conductive layer having a heating function incorporated within the adhesive and covering a fraction of the surface of the glazing at most equal to 66% containing the main viewing zone.

It is proposed to produce a laminated glazing composed, over the whole of its surface, of a "structural" plastic sheet and of a protective plastic sheet, adhesively bonded together by an "interlayer" flexible plastic material. The heating function is then contributed by a thin glass covered with a transparent conductive layer and positioned within the interlayer material in a reduced zone of the glazing covering the favored viewing zone.

The reduction in the surface area of the heating glass with respect to the surface of the glazing then makes it possible to simplify its manufacture. In addition, by being limited to the main viewing zone, the top and low zones having high curvature are not covered.

Main viewing zone is understood to mean the zone which necessarily has to be deicing in order to allow the aircraft to be used under icing flying conditions.

With the present invention:
 heating can be applied to glass which makes possible the use of transparent conductive layers having good optical performance qualities;
 as the glass is not exposed to small stones, it can be thin, which makes possible a reasonable glazing mass;
 the zone covered by the glass is restricted, which makes it possible to considerably reduce the complexity of manufacture of the glass; this also limits the mass of the glazing;
 the heating system is encapsulated in the plastic glazing, which reduces the risks related to the penetration of moisture and peripheral initiations of delamination.

Preferably, the structural and protective plastic sheets are constituted of polymethyl methacrylate (PMMA), polycarbonate (PC), polyurethane (PU), polyester, alone or in combination, mixture, alloy or copolymer of several of them.

Preferably, the adhesive is constituted of thermoplastic polyurethane (TPU), polyvinylbutyral (PVB) or ethylene/vinyl acetate (EVA), alone or in combination, mixture, alloy or copolymer of several of them.

Preferably, the thickness of the structural plastic sheet is between 4 and 9 mm.

According to one embodiment of the invention, the structural plastic sheet is a laminate of identical or different materials.

Preferably, the thickness of the protective sheet is between 0.5 and 4 mm, preferentially between 1 and 1.5 mm.

Preferably, the thickness of the interlayer adhesive layer of adhesive is between 1.5 and 4 mm.

Preferably, the structural and protective plastic sheets have a total thickness of between 4 and 9 mm. The weight of the laminated glazing is then contained and sufficient to satisfy the mechanical requirements required for a helicopter glazing.

Preferably, one at least of the two exterior faces of the laminated glazing exhibits at least one functionalization of hydrophobic (such as fluorosilane), hydrophilic, abrasion-resistance (such as polysiloxane) or electric dissipator type.

Preferably, the thickness of the glass is between 0.5 and 1.2 mm, preferentially between 0.5 and 0.7 mm.

Preferably, the glass is of the type of soda-lime, borosilicate or aluminosilicate having undergone chemical reinforcing.

In accordance with two alternative forms of the invention, the conductive layer is on the face of the glass oriented either toward the protective plastic sheet or toward the structural plastic sheet.

Preferably, the conductive layer is of transparent doped metal oxide (preferentially tin-doped indium oxide or ITO (Indium Tin Oxide)), metallic (preferentially silver or gold) or interference metallic (preferably silver) type.

Preferably, the surface area of the glass is limited to the main viewing zone increased by a width at least equal to 10 mm, preferentially the main viewing zone increased by 10 to 200 mm over its periphery.

Preferably, the laminated glazing is suitable for being directly bolted to the vehicle or adhesively bonded to a frame bolted to the vehicle or adhesively bonded to the vehicle.

Preferably, the vehicle/glazing mechanical connection is made solely on the structural plastic sheet or on the structural plastic sheet+protective plastic sheet laminate.

Another subject matter of the invention is a first application of a laminated glazing as described above as anti-icing glazing, in which the protective plastic sheet is intended to be oriented toward the outside atmosphere. The first object of this application is the management of the ice capable of being formed on the surface of the glazing in contact with the outside atmosphere.

A final subject matter of the invention consists of a second application of a laminated glazing as described above as antimisting glazing, in which the protective plastic sheet is intended to be oriented toward the inside of the vehicle. The first object of this application is the management of the mist capable of being formed on the surface of the glazing in contact with the inside of the vehicle.

In some uses of the laminated glazing of the invention, in some climates, ice is also capable of being formed on the face of the laminated glazing in contact with the inside of the vehicle. The heating power of the conductive layer is opportunely adapted in order for the management of this ice to be carried out in addition to the first or the second application mentioned above, as the case may be.

Although this is not a preferred alternative form of the invention, the latter does not in any way exclude a protective plastic sheet being adhesively bonded on either side of the structural plastic sheet, a glass covered with a conductive layer having a heating function being incorporated within each of the two interlayer layers of adhesive.

The invention is now illustrated by the following description of the single appended drawing:

FIG. 1 diagrammatically represents in section a helicopter heated glazing according to the invention.

FIG. 2 schematically represents a front view of a portion of the glazing of FIG. 1.

With reference to FIG. 1, a helicopter glazing exhibits curvatures which are most pronounced in the top and bottom parts, a double curvature and a nondevelopable geometry. It consists of a structural sheet 1 of PMMA with a thickness of 6 mm laminated with a protective sheet 3 of PMMA with a thickness of 1.25 mm by means of an interlayer adhesive layer 2 of TPU with a thickness of 2.25 mm.

In a central part of the surface of the laminated glazing, a sheet of chemically reinforced aluminosilicate glass 4 with a thickness of 0.7 mm is incorporated in the adhesive layer 2. The glass sheet 4 carries, on its face oriented toward the structural sheet 1, an ITO heating layer. The latter makes it possible to prevent the formation of ice on the free surface of the protective sheet 3, in contact with the outside atmosphere. It is noticed that the glass sheet 4 is relatively flat to very slightly curved, confined in the main viewing zone of the laminated glazing, which comprises, above and respectively below the glass sheet 4, zones of complex curvature having a nondevelopable surface.

The invention claimed is:

1. A light aerial vehicle laminated glazing comprising:
   a structural transparent plastic sheet covering a whole of a surface of the glazing,
   a protective transparent plastic sheet covering the whole of the surface of the glazing,
   an interlayer adhesive bonding the structural and protective transparent plastic sheets,
   a glass covered with a conductive layer having a heating function incorporated, the glass covered with the conductive layer being entirely within the interlayer adhesive and covering a fraction of the area of the glazing at most equal to 66% containing a main viewing zone, the main viewing zone located only in a central region of the laminated glazing.

2. The laminated glazing as claimed in claim 1, wherein the structural and protective transparent plastic sheets are constituted of polymethyl methacrylate (PMMA), polycarbonate (PC), polyurethane (PU), polyester, alone or in combination, mixture, alloy or copolymer of several of them.

3. The laminated glazing as claimed in claim 1, wherein the adhesive is constituted of thermoplastic polyurethane (TPU), polyvinylbutyral (PVB) or ethylene/vinyl acetate (EVA), alone or in combination, mixture, alloy or copolymer of several of them.

4. The laminated glazing as claimed in claim 1, wherein a thickness of the structural plastic sheet is between 4 and 9 mm.

5. The laminated glazing as claimed in claim 1, wherein the structural transparent plastic sheet is a laminate of identical or different materials.

6. The laminated glazing as claimed in claim 1, wherein a thickness of the protective transparent plastic sheet is between 0.5 and 4 mm.

7. The laminated glazing as claimed in claim 1, wherein a thickness of the interlayer adhesive layer of adhesive is between 1.5 and 4 mm.

8. The laminated glazing as claimed in claim 1, wherein the structural and protective plastic sheets have a total thickness of between 4 and 9 mm.

9. The laminated glazing as claimed in claim 1, wherein one at least of its two exterior faces exhibits at least one functionalization of hydrophobic, hydrophilic, abrasion-resistance or electric dissipator type.

10. The laminated glazing as claimed in claim 1, wherein a thickness of the glass is between 0.5 and 1.2 mm.

11. The laminated glazing as claimed in claim 1, wherein the glass is a soda-lime, borosilicate or aluminosilicate glass having undergone chemical reinforcing.

12. The laminated glazing as claimed in claim 1, wherein the conductive layer is on a face of the glass oriented toward the protective or structural plastic sheet.

13. The laminated glazing as claimed in claim 1, wherein the conductive layer is made of transparent doped metal oxide, is metallic or is interference metallic.

14. The laminated glazing as claimed in claim 1, wherein a surface area of the glass is limited to an area of the main viewing zone plus a peripheral region at least 10 mm wide.

15. The laminated glazing as claimed in claim 1, wherein the laminated glazing is suitable for being directly bolted to the vehicle or adhesively bonded to a frame bolted to the vehicle or adhesively bonded to the vehicle.

16. The laminated glazing as claimed in claim 1, wherein a vehicle/glazing mechanical connection is made solely on the structural plastic sheet or on the structural plastic sheet+ protective plastic sheet laminate.

17. A method comprising manufacturing an anti-icing glazing with the laminated glazing as claimed in claim 1, in which the protective transparent plastic sheet is intended to be oriented toward the outside atmosphere.

18. A method comprising manufacturing an antimisting glazing with the laminated glazing as claimed in claim 1, in which the protective transparent plastic sheet is intended to be oriented toward an inside of the vehicle.

19. The laminated glazing as claimed in claim 6, wherein a thickness of the protective transparent plastic sheet is between 1 and 1.5 mm.

20. The laminated glazing as claimed in claim 10, wherein the thickness of the glass is between 0.5 and 0.7 mm.

* * * * *